United States Patent [19]

McCown

[11] 4,170,952
[45] Oct. 16, 1979

[54] CRYOGENIC INSULATION SYSTEM

[75] Inventor: Thomas E. McCown, Huntington Beach, Calif.

[73] Assignee: McDonnell Douglas Corporation, Long Beach, Calif.

[21] Appl. No.: 759,910

[22] Filed: Jan. 17, 1977

Related U.S. Application Data

[63] Continuation-in-part of Ser. No. 665,285, Mar. 9, 1976, Pat. No. 4,116,150.

[51] Int. Cl.$^2$ .................... B63B 25/08; B65D 25/18
[52] U.S. Cl. .................... 114/74 A; 220/452; 220/901
[58] Field of Search ............ 114/74 A, 74 R; 220/9 LG, 15, 901, 452; 156/17

[56] References Cited

U.S. PATENT DOCUMENTS

| | | | |
|---|---|---|---|
| 3,112,043 | 11/1963 | Tucker | 220/15 X |
| 3,319,431 | 5/1967 | Clarke et al. | 114/74 A X |
| 3,339,783 | 9/1967 | Gorman | 220/15 |
| 3,399,800 | 9/1968 | Gilles | 114/74 A X |
| 3,403,651 | 10/1968 | Gilles | 114/74 A |
| 3,765,972 | 10/1973 | Wesp | 156/71 |
| 3,814,275 | 6/1974 | Lemons | 220/9 LG |
| 3,895,152 | 7/1975 | Carlson et al. | 220/9 LG X |
| 3,993,213 | 11/1976 | Burge et al. | 220/9 LG |

*Primary Examiner*—Robert J. Spar
*Assistant Examiner*—Edward M. Wacyra

*Attorney, Agent, or Firm*—Max Geldin

[57] ABSTRACT

Cryogenic insulation system for containers for storage of cryogenic liquefied gases such as LNG, comprised of a low temperature resistant metal, preferably high nickel steel, primary membrane or liner supported by a primary layer of reinforced foam insulation, and a secondary liner positioned adjacent to and sandwiched between the primary layer of foam insulation and a secondary layer of reinforced foam insulation. The preferably high nickel steel primary liner or membrane is supported above the primary foam insulation layer by stiffened ends of the reinforcement fibers which extend above the surface of the foam insulation, providing a small gap between the foam and the membrane. There is provided at corners, particularly at 90° corners, and disposed within the primary and secondary foam insulation layers, a cooperating system of a coupler attached to the container wall or ship hull, ball joint coupler bolt and plywood support attached to the primary high nickel steel liner, to transfer loads from the liner to the container wall or ship hull, while permitting the corner structure to move under loads applied by the liner. Insulation support panels are provided for supporting the insulation system against the container wall or ship hull employing adhesive plastic beads or modules which are cured to form a rigid load carrying bearing for the support panels, and to maintain the panels spaced from the container wall or ship hull.

21 Claims, 19 Drawing Figures

FIG_1

FIG_1A

FIG_2

FIG_2A

FIG_3

FIG_4

FIG_9

FIG_10

FIG_11

CRYOGENIC INSULATION SYSTEM

This application is a continuation-in-part of my copending application Ser. No. 665,285, filed Mar. 9, 1976, now U.S. Pat. No. 4,116,150.

BACKGROUND OF THE INVENTION

This invention relates to containers, tanks or ships, for the storage or transportation of cryogenic liquids such as liquid natural gas (LNG), and is particularly concerned with containers, tanks or ships of the above type containing non-metallic, e.g. plastic, foam insulation and one or more liners, and preferably a low temperature resisting, i.e. low thermal expansion, liner such as nickel steel, and a support system for the liner or membrane, and for the foam insulation layers, and including a corner structure permitting transfer of loads from an inner liner to the tank wall and permitting movement of the insulation at such corner under such loads.

A container or tanker for the storage and/or transportation of a cryogenic liquid must be designed to withstand extremely cold temperatures. Generally vessels of this type are composed of an outer wall of a rigid structure, a heat insulating layer provided at the inside surface of such wall and an inner membrane on the inside surface of such heat insulating layer. Often several heat insulating layers of non-metallic, e.g. plastic, foam insulation, are employed and one or more membranes, particularly an inner liner or membrane such as a nickel steel liner in contact with the cryogenic liquid and one or more additional secondary liners positioned between foam insulation layers. The primary liner, generally made of a thin low temperature resistant (low thermal expansion) material such as nickel steel, is maintained in close contact with the surface of the adjacent heat insulating layer and transmits the internal pressure applied by the low temperature liquefied gases through the heat insulating layers to the outer container or the hull of a tanker. Illustrative of such a system is U.S. Pat. No. 3,814,275, to Lemons.

Of particular importance, the container or its insulation system must be capable of withstanding the thermal strains induced by the cold liquid and the transients during the cooling and warming cycles caused by the loading and unloading of the liquid, and the mechanically induced strains from the ship hull or container displacement during operation. The magnitude of such thermal strains induced when cooling most materials, in a restrained condition, to cryogenic temperatures is sufficient to cause yielding of the material, particularly the thin metal membranes employed as liners. This yielding will result in fracture and failure of such materials on subsequent warming and cooling cycles resulting in a failure of the system. Many designs and materials have been proposed to solve this problem. However, generally the solution to this problem has resulted in relatively complex membrane support systems which are often difficult to fabricate and are expensive.

Illustrative of the prior art in this respect are the following patents. U.S. Pat. No. 3,724,703 discloses a low temperature liquefied gas storage tank and tanker comprising a heat insulating layer of polyurethane foam, a thin liner, e.g. of nickel steel, and a vacuum pump to detect leaks. U.S. Pat. Nos. 3,931,424; 3,882,591; 3,319,431; 3,692,205; 3,694,986; 3,341,051 and 3,990,382 are illustrative of the prior art with respect to support systems for the foam insulation and the liner or membrane in cryogenic tanks. U.S. Pat. No. 3,399,800 discloses a corner support for the inner membrane of a liquefied gas tank in the form of rigid iron plates and thick metal brackets.

The liquefied natural gas containment system, e.g. described in above U.S. Pat. No. 3,814,275 may be installed on the ship hull or tank using many different installation sequences. Regardless of which installation sequence is selected, the final design may be divided into two categories, (1) the fiber reinforced foam insulation bonded directly to the ship hull or container wall, or (2) the fiber reinforced foam insulated bonded to a support structure which is bonded and/or bolted to the ship hull or container wall. The basic problems in installing the system by adhesive bonding in any large container are (1) cleaning the surface of the container for bonding, (2) controlling the temperature and humidity of the bonding area, and (3) having a relatively flat surface on which to bond the insulation.

To circumvent these problems one approach is to adhesive bond the foam insulation to support panels and bolt the panels in place to limit the adhesive bonding operations in the ship. In this method, however, the ship hull is not flat, and the insulation panels must be supported over a major part of their surface area. U.S. Pat. No. 3,698,588 discloses a load supporting thermal insulation and spacers disposed between the insulation and the outer wall of the container, but such spacers are of a rigid material such as metal.

Further, in the prior art foam insulation systems the primary membrane fits tight against the surface of the foam insulation. The cavity between the membrane (primary barrier) or liner and the container or ship hull is almost completely filled with the foam insulation (secondary barrier), and the cryogenic liquid gas will permeate into the foam insulation. During draining of the tank, this liquid, if allowed to change to a gas, will build up sufficient pressure behind the membrane to cause damage. The removal of the cryogenic liquid and/or gas from behind the primary barrier membrane after a leak occurs has been a major problem.

SUMMARY OF THE INVENTION

It is accordingly an object of the present invention to provide a rigid load carrying support for both the primary and secondary foam insulation layers, while maintaining such insulation system in spaced relation from the wall of a cryogenic liquid tank, even though the wall of the tank or ship hull is warped and uneven. Another object is to provide means and procedure for maintaining the primary liner supported on but spaced a short distance away from the adjacent foam insulation layer, to provide a space for drainage for any cryogenic liquid leaking past the primary liner. A still further object is to provide a corner support system to react against the tension, or tension and bending, of the primary liner when the tank is loaded with crogenic liquid, and which permits movement or rotation of the insulation at the corner under any unsymmetric loads applied by the primary and secondary liners.

According to the present invention, there is provided a design which comprises plastic insulation, particularly layers of reinforced plastic foam insulation, in combination with a primary inner membrane, particularly a low temperature resistant nickel steel membrane, wherein such membrane is unbonded to the adjacent foam insulation but is connected thereto by a tongue arrangement, the tongues being received and held in position in channels provided in tongue retainer members positioned within the primary foam insulation adjacent the primary membrane. This channel-tongue interface arrangement exists over the entire flat foam insulation surface of the tank and permits the primary membrane to float or slide over the surface of the primary foam insulation and such membrane is only rigidly attached along the corners of the tank or container. The channels in the retainer members which receive the tongues also serve for detection of leaks of cryogenic liquid or gas through the primary liner and into the adjacent primary insulation.

The insulation system also includes a secondary barrier or foam insulation layer employing a secondary liner such as for example aluminum foil, fiber glass cloth, or polyvinyl fluoride (Tedlar) as a secondary barrier containment system if the primary barrier system fails. The foam insulation layers are preferably fiber reinforced foam insulation, e.g. employing glass fibers, and are most desirably formed of so-called three dimensional reinforced glass fiber foam insulation wherein the glass fibers are arranged in X, Y, and Z axes, such "3D" foam insulation particularly transmitting forces in tension as well as in compression.

For additionally aiding in purging and venting gases from between the primary foam insulation layer and the adjacent primary membrane or liner along such liner, the reinforcement fibers of the fiber reinforced foam insulation adjacent the liner can be extended beyond the outer surface of such foam insulation, and such outwardly extending fibers preferably being stiffened as by application of a hard resin thereto, to support the primary membrane, and providing a space or gap between the foam and such membrane to which a vacuum can be applied.

An additional feature of the invention system is the provision of corner structures particularly designed to react to the tension loads on the primary membrane at the corners when the tank or tanker is loaded with the cryogenic liquid. For this purpose there is provided at the corners, particularly at the 90° corners, a system of insulating couplers and coupler bolts which react against wood beam or plywood corner supports for the primary membrane, for transmitting tension loads from the primary membrane to the outer wall or hull of the tank or ship. The wood beam or plywood corner supports are connected to the couplers by a bolt having flexible means in the form of a flexible head or ball joint which is moveable and free to rotate with respect to the couplers. Since the foam insulation at the corners is soft and flexible and is not a rigid corner structure, the coupler bolt having such flexible or rotatable connection to the coupler, permits the foam insulation at the corner to rotate and move or to be displaced under an unsymmetric load applied by the primary membrane.

According to a preferred embodiment, at such corner, the edges of the flat primary membrane surfaces are welded to high nickel steel corner strips which are formed around wood beams, and are held in place against the wood beams by bolts and screws. Such wood beams are supported against the cargo pressure heads by the fiber reinforced foam insulation. The tensile loads in the primary, e.g. high nickel steel, membrane, are transmitted from the wood beams to the container wall or ship hull via the above noted coupler bolts and associated couplers spaced along the corner. The wood beams can be laminated or plywood beams, and can be segmented in length along the corner and are free to expand or contract under temperature changes, and do not distort or produce a load along the corner.

The structure of the invention is particularly designed to take high corner loads in tension and also to take bending loads where the latter loads are also present such as at three way or trihedron corners. The couplers which are provided at the corners as noted above take the tension load from the primary membrane directly into the tank wall or ship hull, and such coupler can have a non-metallic portion as an aid in controlling thermodynamic characteristics. Such couplers also are sealed to the secondary liner to prevent penetration of cryogenic liquid in case the primary liner is penetrated and the layer of foam insulation adjacent such membrane is also penetrated.

Stand-off or insulation support panels, e.g. formed of resin impregnated fiber glass, or laminated wood, are provided to support the entire insulation system, and means are provided to support such panels against and to maintain the panels spaced from the container wall or ship hull, and the corners thereof. According to an additional feature of the invention, in order to compensate for irregularities in ship hull flatness and to provide a base for the insulation support panels and to withstand the cargo pressure loads, strips in the form of beads or modules of initially soft and pliable uncured plastic adhesive are applied in place against the container wall or inner ship hull to act as a liquid shim by flowing and extending across the gap between the warped inner ship hull and the flat insulation support panel, when the insulation support panel is attached in position on the inner ship hull, and pressure is applied to the insulation support panel. The adhesive plastic strips upon curing form a rigid load carrying support and attach pad for the insulation support panel around the container wall or ship hull. This avoids adhesive bonding of the foam insulation system to the tank wall or ship hull, and provides a sump to trap water and keep it from penetrating into the foam insulation system.

BRIEF DESCRIPTION OF THE DRAWING

The invention will be more fully understood by the description below of a preferred embodiment taken in connection with the accompanying drawing wherein.

DESCRIPTION OF THE PREFERRED EMBODIMENT

Figure 1:
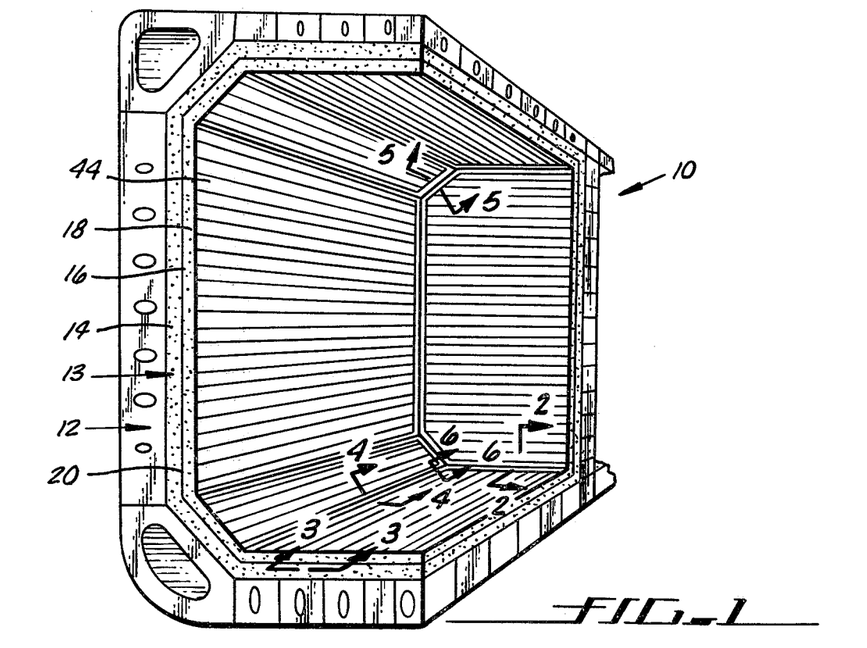
FIG. 1 is a perspective view showning a midship and center line section of a membrane (LNG) tanker containing an insulation system according to the invention.

Referring to FIG. 1 of the drawing, numeral 10 indicates a cryogenic liquid or LNG tanker having an inner hull 12 and an insulation system 13 positioned around the inner hull. Such insulation system is comprised of an outer fiber reinforced foam insulation layer 14 disposed against the inner hull 12, and an inner fiber reinforced foam insulation layer 16. Such fiber reinforced foam insulation layers are preferably three-dimensional glass fiber reinforced polyurethane foam layers. Such fiber reinforced insulation material comprises blocks or planks of closed cell polyurethane foam having layers of glass fibers, each layer of fibers extending in both a horizontal and transverse direction, the X and Y reinforcement fibers, and layers of fibers extending in a vertical direction, the Z reinforcement fibers.

Figures 1A, 2:
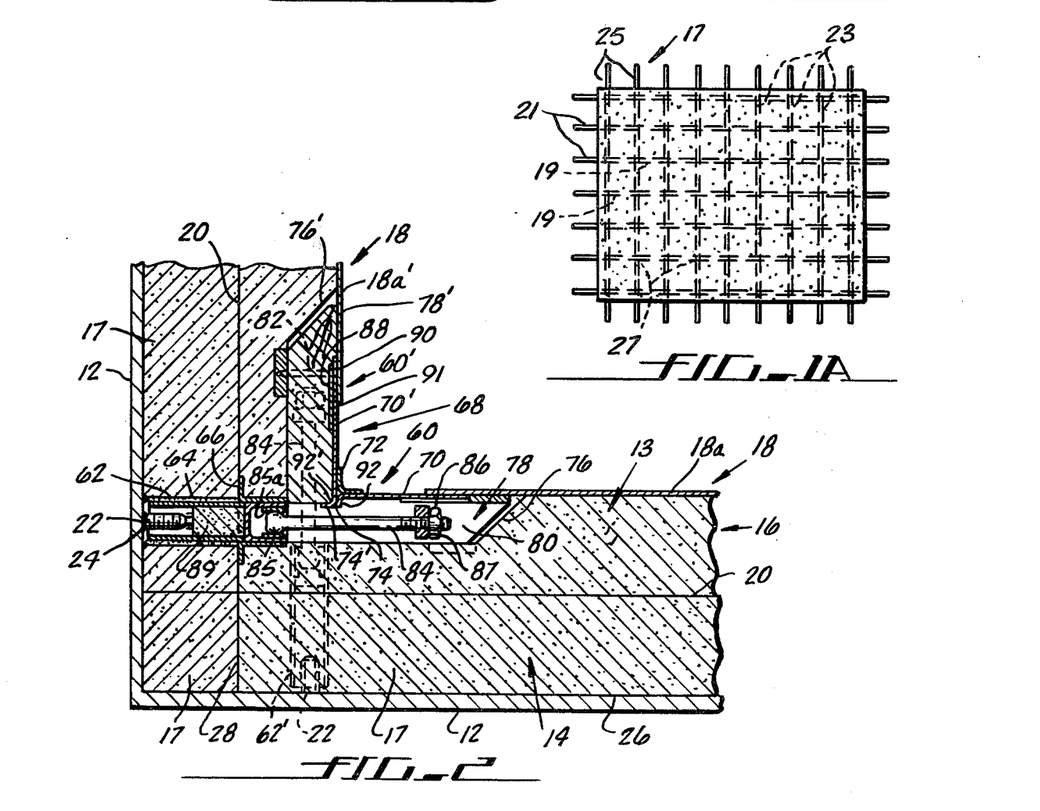
FIG. 1a illustrates a preferred type of fiber reinforced insulation material termed herein "3D" foam insulating employed in the system of FIG. 1.
FIG. 2 is a 90° transverse corner section of the tanker, taken on line 2—2 of FIG. 1, showing a bolt with a ball joint connection to the coupler to permit movement of the insulation material at the corner section.

FIG. 1A illustrates this type of material comprising blocks 17 of closed cell polyurethane foam having layers of glass fibers 19 embedded in the foam and having exposed fiber ends 21 to facilitate bonding of the reinforced polyurethane blocks 17 to a structural member such as a tank wall. The polyurethane block 17 has other glass fibers 23 extending vertically, with exposed fiber ends 25 to facilitate bonding of the individual blocks to each other, and for supporting the primary liner or membrane, as described hereinafter, and layers of other fibers 27 extending horizontally and normal to the fibers 19. This type of reinforcement is known as X-Y-Z reinforcement, the X fibers being longitudinal fibers, the Y fibers transverse fibers and the Z fibers vertical fibers, e.g. as shown in U.S. Pat. No. 3,322,868, and the resulting reinforced foam is also known as "3D foam." Preferably, planks of such 3D polyurethane foam are bonded together by a suitable adhesive, preferably a polyurethane adhesive, to form the respective outer and inner insulation layers 14 and 16, respectively.

A thin primary liner or barrier membrane 18 is positioned in contact with the inner 3D foam insulation layer 16 and is connected thereto in the manner described more fully below. Such primary membrane is a low temperature resistant (low thermal expansion) material such as nickel steel, preferably a high nickel steel such as the material marketed as Invar, although other materials such as stainless steel can be employed. The membrane 18 is a fluid impermeable material and forms an interior membranous vessel for containment of the cryogenic liquid. A secondary liner 20 is sandwiched between the outer 3D foam insulation layer 14 and the inner 3D foam insulation layer 16. Such liner can be a combination of fiber glass cloth with a thin metal, e.g. aluminum, foil or such secondary liner can be a resin impregnated fiber glass cloth e.g. impregnated with polyurethane resin, or such resin impregnated fiber glass cloth in combination with a polyvinyl fluoride film marketed as Tedlar. Such secondary liner can be an imperforate liner, which prevents penetration of cryogenic liquid from the inner foam insulation layer 16 to the outer foam insulation layer 14.

Referring to FIG. 2 of the drawing, the first step in the installation of the insulation system 13 of the invention is the location and installation of a plurality of studs 22 disposed at spaced intervals on the inner ship hull 12, and resistance welded thereto as indicated at 24. These studs provide tie down points for reaction to the loads transmitted by the primary high nickel steel or Invar liner 18, as pointed out more fully hereinafter. Once the studs are welded in place on the container wall or inner ship hull, the outer 3D fiber reinforced polyurethane foam insulation layer 14 is adhesively bonded at 26 to the inner ship hull 12. As previously indicated, the 3D fiber reinforced polyurethane foam insulation forming the outer layer 14 is fabricated in rectangular planks or blocks 17, e.g. about 2 feet wide and about 10 feet long, and such planks bonded together by a suitable adhesive, as indicated at 28, and best seen in FIG. 3. The outer or first layer of 3D fiber reinforced polyurethane foam insulation 14 is adhesively bonded to the ship hull 12 using a vacuum bag technique or other suitable means to apply pressure to hold the parts in place during cure of the adhesive.

The resin impregnated fiber glass secondary liner 20 is bonded to the respective planks 17 of 3D polyurethane foam forming the outer insulation layer 14, before such planks are installed and bonded to the ship hull 12, and following such installation, an overlap splice 30 is applied between the planks to make the secondary liner 20, e.g. polyurethane impregnated fiber glass cloth combined with a polyvinyl fluoride film, continuous over the surface of the outer layer of foam insulation 14.

The 3D foam insulation planks 17 in the outer foam layer 14 are provided with a system of interconnected channels 32. As noted in FIG. 9, the channels 32 run in a horizontal direction along the plank-to-plank bonds and are then manifolded together along the corners, as indicated at 38, the manifold being connected to a vacuum pump (not shown) to form the secondary liner leak detection system. The channels 32 can be a plastic or fiber glass channel disposed in mating grooves 36 formed in the polyurethane foam planks 17 and adhesively secured at 37 at the plank-to-plank adhesive bonds 28.

After installation of the first or outer layer of foam insulation 14 and the secondary liner 20, the second or inner layer of foam insulation 16 is adhesively bonded in place in contact with the secondary liner 20, employing the same procedure as for installing the first foam insulation layer 14, that is by bonding together 3D foam insulation planks 17' similar to the planks 17, and adhesively bonding the planks together at 28'. After the inner foam insulation layer 16 has been adhesively bonded in place over the first layer 14, grooves 40 are cut in the upper surface of the inner foam layer 16, such grooves being cut parallel to the ship's axis on longitudinal surfaces. Such grooves provide a recess in the inner foam insulation layer 16 to receive a plywood tongue retainer strip 42, which is bonded at 43 to the inner foam insulation layer 16, as shown in detail in FIG. 8 of the drawing. As will be described in further detail hereinafter, the tongue retainer strips 42 serve to connect the primary high nickel steel liner 18 to the inner layer of foam insulation 16. Referring again to FIGS. 3 and 8, it will be seen that the primary liner 18 is formed of a plurality of sections or strakes 44, each section having upstanding flanges 46 at its opposite sides. Between the adjacent flanges 46 of the liner sections 44 is positioned a tongue 48, preferably also formed of low temperature resistant material such as high nickel steel, the lower or inner portion of tongue 48 being received in a channel 50 in the plywood tongue retainer strip 42, and the bent portion 52 of the tongue 48 being received in a channel 54 formed in the tongue retainer strip 42, and at a 90° angle to channel 50. The upper portion of the tongue 48 is welded at 56 to the flanges 46 of the primary liner sections 44. It will thus be seen that the plywood strip 42 functions to retain the tongues 48 which are connected to the primary liner sections 44, and thus holds the primary liner or membrane 18 in place against the inner layer of foam insulation 16. The retainer strips 42 and their associated tongues 48 are evenly spaced across the surface of the inner foam insulation layer 16, and hold the strakes 44 of the primary liner in place.

Figure 8:
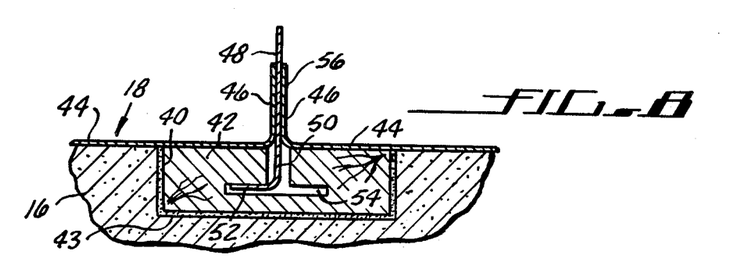
FIG. 8 is an enlarged detail of the tongue and tongue retainer structure for connecting the primary membrane to the primary insulation layer, taken at the circular arrows marked A in FIG. 3.

The above design of the channel-tongue interface or connection permits a degree of relative movement between the tongues and channels, and thus allows the primary liner to float or slide over the surface of the foam insulation, such liner being rigidly attached only along the corners of the container or tank, as described in greater detail below.

Figure 9:
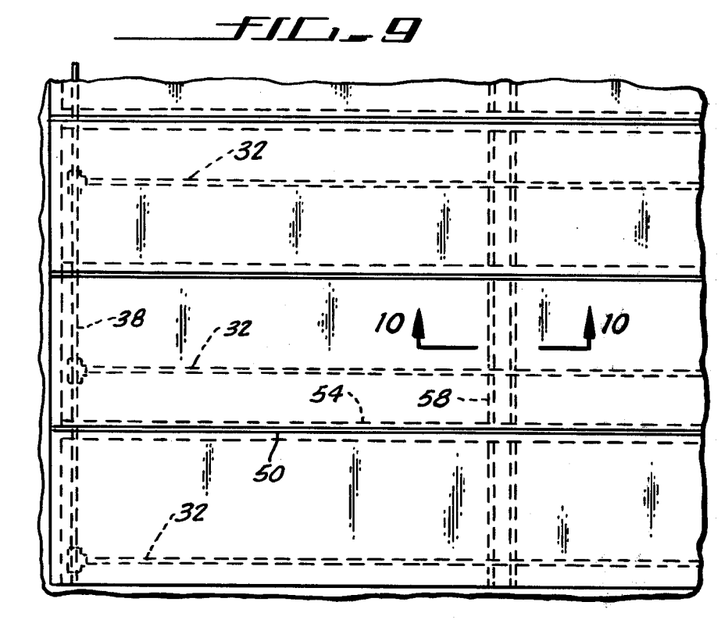
FIG. 9 is a plan view of the cryogenic insulation system of FIG. 1, showing both the primary and the secondary liner leak detection systems.

Also, the channels 50 and 54 in the retainer strip 42 serve as a channel for the primary membrane leak detection system and for a purge system to remove the oxygen from behind the primary liner. The primary membrane barrier leak detection channels 50, 54 are manifolded together at 58, as illustrated in FIG. 9, and connected to a vacuum pump (not shown). The channels 50 and 54 may also be manifolded together where they intersect the cavity 76 formed at the transverse 90° corners shown in FIG. 2. The primary barrier leak detection system serves several functions, namely, to determine if leaks exist in the primary membrane or liner 18, to limit the external pressure and remove the oxygen behind the primary membrane so as to prevent it from being damaged by buckling into the empty or partially full tank, to remove liquid or gas products which leak through the primary membrane, and as a test system to evaluate the integrity of the secondary liner-barrier system. The above described secondary channel system is employed to detect leaks in the secondary liner 20.

Figure 2A:
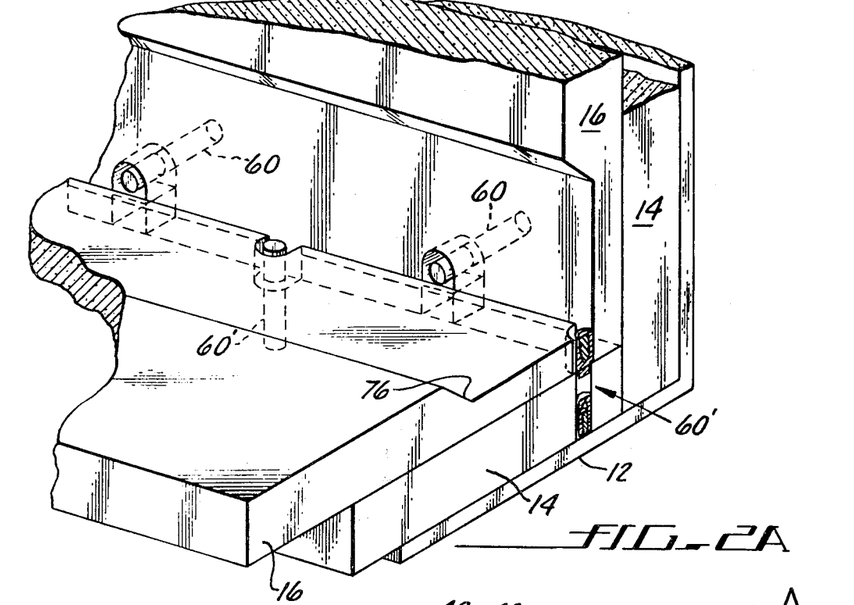
FIG. 2a is an isometric view of the alternate positioning of the adjacent coupler and bolt systems shown in FIG. 2.

Now referring to FIGS. 2 and 2a, showing the right angle corner design of the invention system along a horizontal and vertical transverse interface, and which is adapted to take tension loads in both the horizontal and transverse direction at 90° from the primary membrane 18 to the ship hull 12, there is provided a plurality of coupler systems 60 positioned at spaced approximately equal intervals within the foam insulation layers 14 and 16, in a plane normal to the plane of FIG. 2, and a plurality of like coupler system 60' positioned at right angles to the coupler systems 60 and spaced from each other in a plane perpendicular to the plane of FIG. 2 and also perpendicular to the plane of the coupler systems 60. Coupler systems 60' are positioned alternately between adjacent coupler systems 60, as seen in FIG. 2a, and are likewise positioned within the 3D foam insulation layers 14 and 16.

Referring to the coupler system 60, such systems each comprise a tubular non-metallic, preferably plastic, coupler 62 which is disposed around one of the studs 22 and passes through the outer foam insulation layer 14 and extends part way into the inner foam insulation layer 16. Although non-metallic couplers are preferred, metallic couplers such as a steel coupler can also be used. The coupler is held in place within the foam insulation layers and against the inner ship hull 12, by an adhesive bond 64 or by tack welding the coupler to the stud 22. It will be noted that the secondary liner 20 is apertured to receive the coupler 60 and a secondary, e.g. resin impregnated, fiber glass liner splice 66 is provided to fit around the coupler and is adhesively bonded in place thereagainst.

The corner insulation system shown in FIG. 2 for a 90° corner includes a high nickel steel angle assembly 68 of substantially the same thickness as the primary liner 18, and formed of a pair of angle members 70 and 70' disposed at right angles to each other and interconnected by an angle piece 72 which is welded to angle members 70 and 70' to hold them in position. Each of the angle members 70 and 70' carries at its inner end a flange 74 or 74' bent at a right angle to the respective angle members 70 and 70'.

Positioned within cut away portions or cavities 76 and 76' of the inner foam insulation layer 16 adjacent the right angle corner, are two plywood corner support members 78 and 78', which are hollowed out at each end, as indicated at 80. Screws as indicated at 82 are provided to hold the plywood supports 78 and 78' and the angle members 70 and 70', together in the cut outs 76 and 76', within the foam insulation layer 16. Although insulating corner support members 78 and 78' are preferred, these can be metallic members. The plywood supports 78 and 78' are each cut away to provide a recess 88 to receive an asbestos-stainless steel weld insulation member 90. The adjacent ends of the primary membrane 18 are welded at 91 to angle members 70 and 70'.

Connected to the plywood corner support, e.g. 78, at the corner assembly is a steel coupler bolt 84. The coupler bolt 84 has a flexible connection to the coupler 62 in the form of a ball joint 85 at the outer end of bolt 84, which is received for free rotation within a seat 85a mounted on the inner end of the coupler 62, seat 85a having a curvature which matches the curvature of ball joint 85. The term "flexible connection" is meant to denote a connection between the coupler bolt 84 and the coupler 62 which permits freedom of movement of such connection with respect to the coupler. At its opposite end, bolt 84 is fixed in position against a shoulder 87 of the plywood corner support by means of a nut 86. The center of the coupler 62 is filled with foam insulation as at 89. The coupler systems 60' are of the same construction as the above described coupler systems 60.

It will be noted that the flange 74 of angle member 70 is positioned around the inner shoulder 92 of the plywood support 78 and flange 74' of angle member 70' is positioned around inner shoulder 92' of plywood support 78', to secure such angle members to the respective plywood supports. Also, it will be noted that the coupler bolt 84 is parallel to angle member 70 and the associated liner section 18a connected thereto, and coupler bolt 84' is parallel to angle member 70' and associated liner section 18a' connected thereto.

It will thus be seen that when the ship is filled with cryogenic liquid such as LNG, the tension loads thus applied by the primary liner 18 and liner section 18a and the angle assembly 68 at the right angle corner in a horizontal direction, viewing FIG. 2, is taken by the coupler systems 60, i.e. the plywood support 78, its associated coupler bolt 84 and the coupler 62, and such reactive force is transmitted to the inner ship hull 12. For tension loads applied by the primary liner in a vertical direction, as seen in FIG. 2, such loads are taken by the similar coupler systems 60' and transmitted to the inner ship hull 12. Of particular significance, since the plywood corner supports 78 and 78' are supported by the foam insulation layers 16 and 14, and not by a rigid frame, and since such foam insulation is relatively soft and flexible, the ball joint connection 85 of the coupler bolt 84 of the respective coupler systems 60 and 60' permits the corner structure to move or rotate to a degree, under an unsymmetric load applied by the primary liner 18, whereby the coupler bolt can be disposed at an angle to the primary liner 18, rather than parallel thereto, as seen in FIG. 2. If a normal steel bolt or rod is threaded into the coupler, as described and shown in my above copending application, fatigue failure tends to occur to the threads after a period of time under normal operating conditions. The flexible ball joint connection 85 hereof, however, allows free rotation of the end of the coupler bolt connected to the coupler 62, and does not cause high stresses in the parts. The ball joint connection 85 has the additional advantage that it permits the coupler 62 to be positioned initially at an angle to the bolt 84, e.g. at a corner other than a 90° corner.

Thus, the coupler assemblies 60 and 60' take the tension loads from the primary liner 18 at the right angle corner directly into the ship hull, and the non-metallic or plastic couplers 62 and 62' control the thermodynamic characteristics to provide further insulation. Thermal tests have indicated, however, that steel couplers can also be used. The couplers 62 and 62' further function to seal the secondary liner 20 and prevent penetration of cryogenic liquid in the event that the primary liner is penetrated and the inner foam insulation layer 16 is penetrated by cryogenic liquid. It is further noted that the use of the 3D reinforced foam insulation also is of advantage in taking tension loads, and the thermal load is also taken by the 3D foam insulation at the corners.

As the foam insulation is exposed to a cryogenic liquid it will start to penetrate the foam insulation material. At a certain depth, as it penetrates the foam insulation, the liquid, because of the increased temperature, will turn to a gas and expand. This local build-up in vapor or gas pressure within the reinforced foam insulation will prevent the liquid-gas interface from moving deeper into the foam insulation, and limit the depth to which the liquid will penetrate the foam insulation. This phenomenon prevents this internal vapor pressure from destroying the foam insulation. Since the penetration of the foam insulation by any material having a higher conductivity was believed to destroy this liquid-gas interface and cause it to move deeper into the foam insulation and result in a drastic reduction in back face temperature around the penetration, it was unexpected to find that a properly designed combination of coupler 62 and coupler bolt 84, even if comprised of metallic material, does not destroy the stability of this liquid-gas interface.

Figure 5:
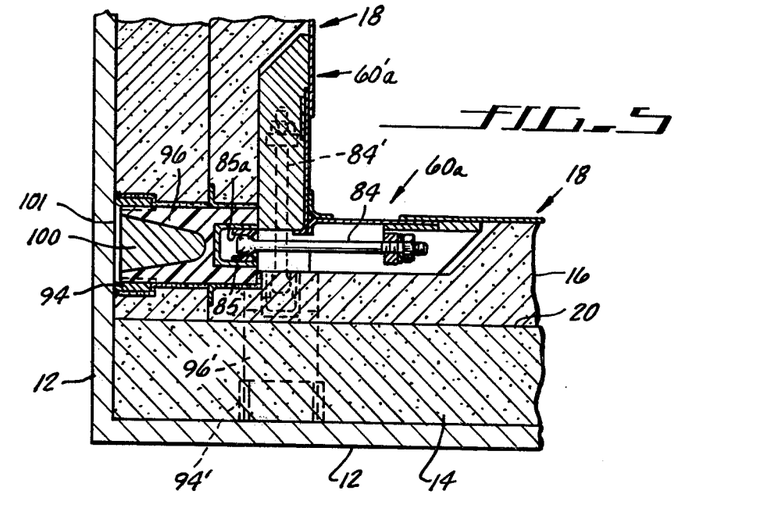
FIG. 5 is a section taken on line 5—5 of FIG. 1, showing the structure of a 90° corner on an oblique interface.

Coupler systems 60a and 60'a for a 90° corner on an oblique surface are illustrated in FIG. 5 of the drawing. These coupler systems are similar to the coupler systems 60 and 60' of the right angle corner described above and illustrated in FIG. 2. However, in the systems of FIG. 5 there are provided short steel tubes 94, 94' which are welded to the inner ship hull 12 and a plastic coupler, such as an injection molded polyester coupler at 96, 96' is threaded into the steel tube 94 or 94'. The outer end portion of the coupler 96, 96' is hollowed out and filled with foam insulation as at 100, and the outer ends of such couplers are adhesively bonded as at 101 to the inner ship hull 12. It will be seen that the right angle corner support system of FIG. 5 functions in a manner similar to that of FIG. 2 to take tension loads produced by contraction of the primary liner in two directions perpendicular to each other, including unsymmetric loads, and to transfer such tension forces efficiently to the ship hull.

Figure 4:
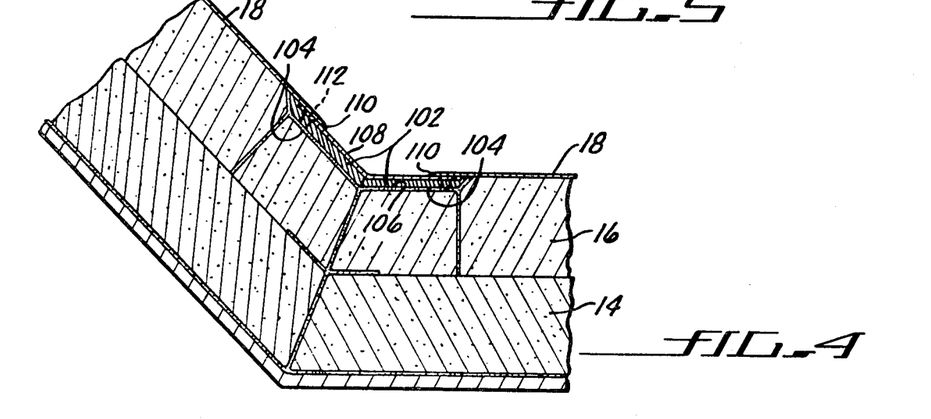
FIG. 4 is a section taken on line 4—4 of FIG. 1, showing the construction at a 135° longitudinal corner.

Referring now to FIG. 4 of the drawing there is shown a longitudinal corner assembly at an oblique angle at 135°. Such longitudinal corner design differs from the 90° corner in that the membrane load reacted by the insulation support system is lower as compared to that for the 90° corner system of FIGS. 2 and 5. In the corner design of FIG. 4 there is provided a pair of plywood insulation strips 102 received in recesses 104 in the inner foam insulation layer 16 and extending in opposite directions from the corner. The plywood strips 102 are adhesively bonded to the foam insulation at 106. If desired, although insulating non-metallic support strips 102 are preferred, metallic support strips can be used. A 135° high nickel steel corner angle membrane 108 is fitted over the plywood corner strips 102 and is connected thereto by drive pin rivets 112, or wood screws. The overlapping end portions of the primary liner 18 and the corner angle member 108 are attached by welding at 110. As previously noted, the tension loads at such 135° corner transmitted from contraction of the primary liner to the ship hull are relatively low as compared to the tension forces at the 90° corners. The asbestos/stainless steel weld insulation member 90 employed in the 90° corner support illustrated in FIG. 2, can also be employed for weld protection in the 135° corner design of FIG. 4, if required, by recessing the plywood insulating strips 102 to the thickness of such stainless steel/asbestos board.

Figure 6:
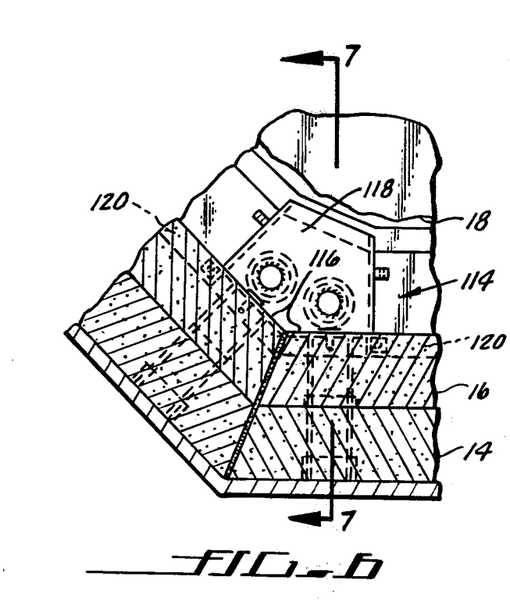
FIG. 6 is a section taken on line 6—6 of FIG. 1, showing the construction of a three way or trihedron corner.
Figure 7:
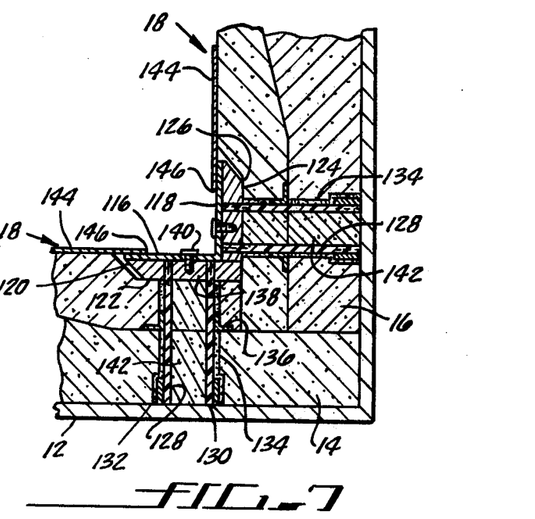
FIG. 7 is a longitudinal section taken on line 7—7 of FIG. 6.

Now referring to FIG. 6 there is shown the construction of the 3 way or trihedron corner structure at intersections of the 135° corner and the transverse or 90° corner. Such 3 way corner resists both tension and bending loads. As seen in FIGS. 6 and 7, there is provided a steel trihedron corner member 114, two sides 116 of which form an angle of 135°, the third side 118 forming a 90° angle with each of the sides 116. The 135° angle sides 116 are each positioned over a plywood support 120 received in recesses 122 in the inner foam insulation layer 16, and the third side 118 of the trihedron angle is positioned in contact with a plywood support 124 received in a recess 126 in the inner foam insulation 16, the plywood support 124 being disposed at a 90° angle to the plywood supports 120. Thus, the plywood support formed of members 120 and 124 is also in the form of a trihedron, and although such trihedron support is preferably a non-metallic insulating member, such trihedron support can be metallic.

Each of the two sides 116, and the third side 118 of the trihedron angle 114 is supported on a fiber glass or steel tube coupler 128 which is normal to each of such sides and extends through both the inner and outer foam insulation layers 16 and 14, respectively, from the respective sides of the trihedron to the inner ship hull 12. The outer ends of each of the coupler tubes 128 are threaded into a steel tube 130 which is welded at 132 to the inner ship hull 12.

The coupler tubes 128 are adhesively bonded and sealed at 134 to the adjacent foam layers 14 and 16, a secondary fiber glass liner splice 136 being fitted around the coupler tube 128 and adhesively bonded and sealed in place.

A steel insert 138 is threadably connected into the upper end of each of the coupler tubes 128, and receives a bolt 140 for connecting the respective sides 116 and 118 of the trihedron angle 114 to the fiber glass tubes. The interior of tubes 128 between the insert 138 and the inner ship hull 12 are filled with polyurethane foam 142. The end portions of the primary high nickel steel liner 18, as shown at 144, are welded at 146 to the respective sides 116 and 118 of the trihedron angle.

It will be seen in FIG. 7 that the 90° angle portions of the trihedron angle construction, tension loads due to contraction of the primary liner 18 are transmitted in both directions at 90° to each other, to the ship hull through the fiber glass tubes or couplers 128, such tubes with the urethane foam filler 134 contained therein providing efficient insulation between the steel trihedron angle 114 and the inner ship hull 12. As seen in FIG. 6, any bending loads imparted by the contraction of the primary liner 18 at the trihedron corner are resisted by the fiber glass tubes 128 connected to the sides 116 of the trihedron angle, and which are in turn attached to the inner ship hull.

Figure 10:
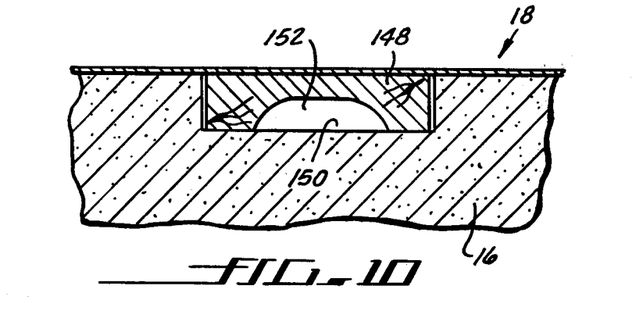
FIG. 10 illustrates an alternative type of primary liner leak detection channel.

Although as illustrated in FIG. 8, the channels 50 and 52 formed in the plywood tongue retainer strips 42 serve as leak detection channels at the connections of the tongues 48 to the primary high nickel steel membrane or liner 18, there can also be provided additional leak detection channels at other locations in the inner foam insulation layer 16, and between the locations of the tongues 48 along the primary liner. Thus, as illustrated in FIG. 10, there can also be provided plywood channel members 148 positioned at spaced locations in recesses 150 of the inner primary foam insulation layer 16 below the primary high nickel steel liner 18, such plywood channel members containing a groove or channel 152, a plurality of such channels being interconnected and manifolded as described above, and connected to a vacuum pump if desired, for leak detection or to purge the oxygen out of the space between the primary membrane 18 and the inner foam layer 16 for fire protection. This area is then filled with nitrogen using the channels for this purpose.

Figure 11:
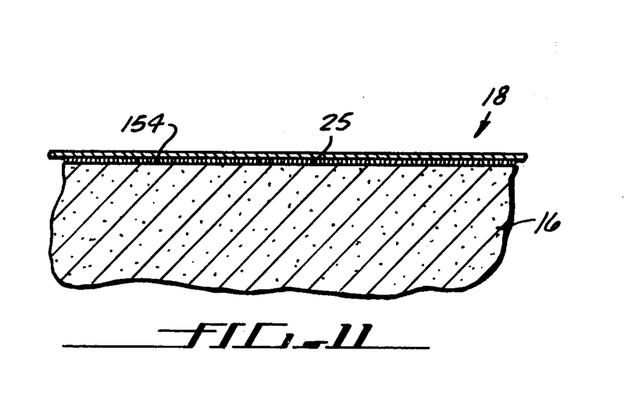
FIG. 11 shows the invention feature wherein the primary liner is supported by the reinforcement fiber ends above the foam insulation surface.

As an alternative to the leak detection system illustrated in FIG. 10, and as an additional feature of the invention for purging and venting any gases between the primary membrane 18 and the inner foam layer 16, as illustrated in FIG. 11, a space can be provided over the surface of the foam layer 16 supporting membrane 18 by extending the Z reinforcement fibers of the 3D foam insulation above the surface of the foam layer 16. For this purpose, and viewing also FIG. 1a, a hard resin, e.g. polyester, coating can be applied to the exposed fiber ends 25 of the vertical reinforcing fibers 23 in the fiber reinforced foam layer 16, to stabilize the ends of the Z fibers to insure that the unsupported fiber ends 25 extending beyond the foam will remain stiff. The primary membrane 18 is now supported on the ends of the Z reinforcement fibers and not on the surface of the foam, thus presenting a small gap or space 154 between the foam and the membrane. By application of a vacuum to such space or gap 154, and/or to the channels 50 and 54 in FIG. 8, the primary liner 18 is further held lightly but firmly against the inner foam insulation layer 16.

Figure 3:
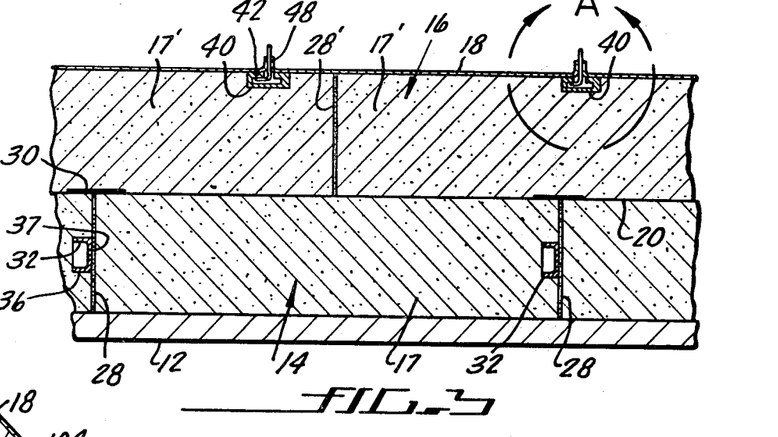
FIG. 3 is a transverse section through the foam insulation and associated liner system, taken on line 3—3 of FIG. 1.
Figure 12:
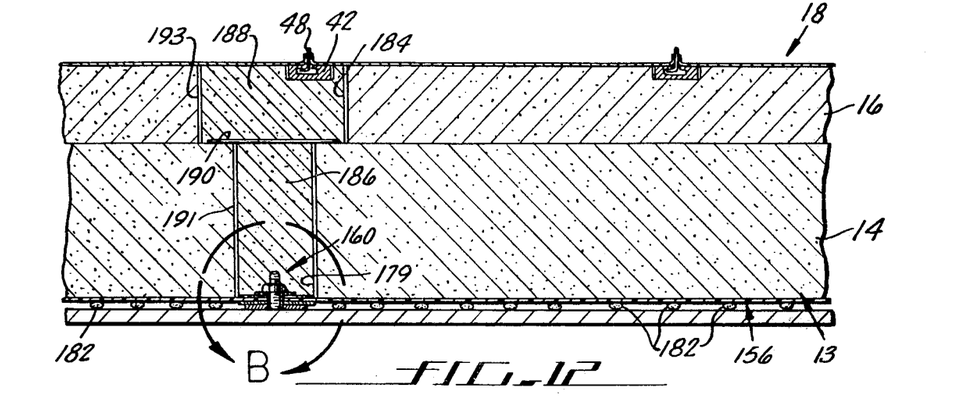
FIG. 12 is a transverse section similar to FIG. 3, showing a modification employing a stand-off or insulation support panel.
Figure 13:
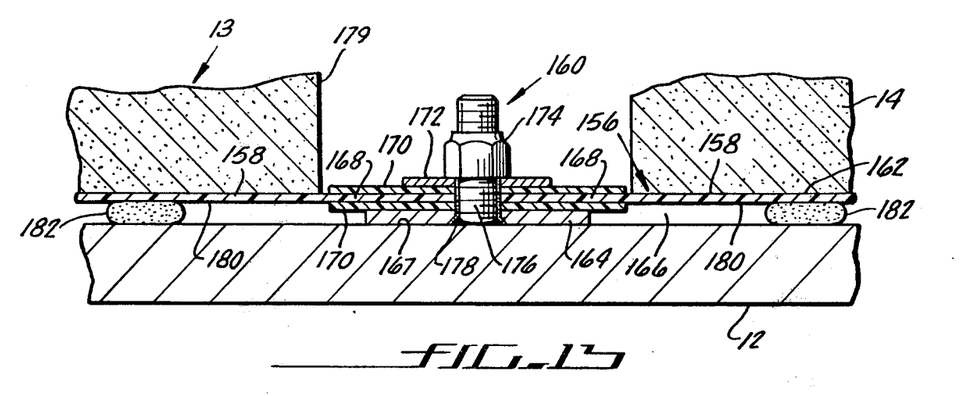
FIG. 13 is an enlarged detail taken at the circular arrows marked B in FIG. 12, showing the stand-off or form insulation support panel and the means for supporting it against but maintaining it spaced from the inner ship hull, such means according to another feature of the invention, being adhesive moldable beads, which upon curing form rigid load bearing supports.

Referring to FIGS. 12 and 13 of the drawing, there is shown an additional feature or modification of the invention system. Thus, instead of placing the outer foam insulation layer 14 in direct contact with and bonded to the inner ship hull 12, as illustrated in FIGS. 2 and 3, there is provided according to the present embodiment and feature, means for supporting and maintaining the outer foam insulation layer 14 spaced from the inner ship hull and avoiding the necessity for bonding the outer surface of the insulation layer 14 to the wall or inner ship hull 12. This feature thus avoids having to clean the surface of the inner wall or ship hull 12 prior to application of adhesive, heating the bonding area for the purpose of adhesively bonding the foam insulation layer 14 thereto, and also affords a sump for trapping any water leaking through the inner ship hull.

Referring to FIGS. 12 and 13, there is thus provided a stand off or insulation support panel 156 extending substantially entirely around the foam insulation system 13, which supports the outer foam insulation 14 and is in turn supported in spaced relation from the inner ship hull 12. The stand off panel 156 can be formed of a suitable material such as resin impregnated fiber glass reinforced plastic, a plastic such as polyvinyl fluoride, or plywood (glue laminated wood sheets), of sufficient strength to support the insulation system 13 and at the same time providing additional insulation effectiveness.

The stand off panel 156 is formed of a plurality of panel members 158 which are joined together and supported in spaced relation from the inner ship hull 12, by the connecting structure indicated generally at 160. The stand off or insulation support panel members are adhesively bonded at 162 to the outer surface of the outer foam insulation layer 14. The connecting structure 160 comprises a spacer 164, e.g. in the form of a steel shim, of suitable thickness. The thickness of the spacer 164 is selected so that a suitable space or gap 166, e.g. 4 to 12 mm, will be provided between the stand off panel 156 and the inner ship hull 12 and affording a flat surface of attachment for the stand off panel. Such spacer 164 can be adhesively bonded at 167 to the inner ship hull 12, or attached as by tack welding to the inner ship hull.

The adjacent edge portions 168 of panel members 158 ar sandwiched between a pair of resin impregnated fiber glass reinforced plastic or plywood splice strips 170 and such assembly is held in place by a steel washer 172 and nut 174 on a stud 176 which is welded at 178 to the inner ship hull 112. The adjoining surfaces of the outer edge portions 168 of panel members 158, and the splice strips 170 are adhesively bonded together by coating with adhesive prior to assembly of these parts, to form a bond and seal between the adjacent panel members 158. The entire connector device 160 is positioned within a suitable cutout portion 179 of the adjacent outer foam insulation layer 14, as best seen in FIG. 12. A plurality of such connector systems 160 are provided at suitable spaced intervals around the entire foam insulation system 13 within the inner ship hull 12.

The central portions 180 of the stand off or insulation support panel members 158 are supported by and/or attached to the inner ship hull 12 by means of a plurality of spaced adhesive strips 182 in the form of beads or modules, sandwiched between the panel members 158 and the inner ship hull 12, and in spaced substantially parallel relation substantially the entire ship hull. The beads or strips 182 are of a thickness such as to maintain the stand off or insulation support panel members 158 flat and substantially parallel with the inner ship hull along the length and periphery of the stand off or insulation support panel 156 around the foam insulation system 13. Since the inner ship hull is not flat and the insulation support panel members 158 must be supported over a major part of their surface area, the beads or modules 182 are initially employed as a liquid or soft shim to compensate for irregularities in ship hull flatness. For this purpose, a pliable or moldable plastic adhesive composition of any suitable type such as a plastic, e.g. an epoxy or polyester resin, or a mastic, is shaped to form the beads or modules 182. Such beads or modules of soft and pliable uncured adhesive are applied or adhered either to the insulation support panel members 158 or to the inner ship hull 12, and the support panel members are bolted in place by the connector systems 160. In preferred practice such support beads or strips are spaced uniformly across or along the length of the stand-off or insulation support panel 156. Since the adhesive beads or modules 182, when initially placed between the insulation support panels 158 and the ship hull 12, are still in fluid, although relatively still condition, the application of pressure thereto by the support panels 158 causes the adhesive beads 182 to flow and to fill, that is, extend across, the space or gap 166 between the inner ship hull, and the flat insulation support panel members 158 forming the support panel 156, as seen in FIG. 13, regardless as to any unevenness in, or any warped areas of the inner ship hull.

The adhesive beads 182 have incorporated therein a suitable catalyst, as known in the art, which permits gradual subsequent curing of the adhesive at normal or room temperature, to form a rigid load carrying bearing and attach pad of the insulation support panel. The curing of the adhesive at normal or ambient temperature thus avoids heating the inner ship hull. The space 166 thus formed adjacent the insulation support panel 156 provides a cavity or sump for the collection of water which may leak through fatigue cracks in the inner ship hull, thus indicating the presence of dangerous stress cracks in the inner ship hull, and such water may be channelled to the bottom of the ship and removed by suitable means (not shown).

The spaces 179 and 184 above the connections 160 are filled with two 3D foam insulation strips 186 and 188 with an overlapping secondary liner splice 190, e.g. of resin impregnated fiber glass, sandwiched between the strips 186 and 188, which are adhesively bonded to the adjacent foam insulation layers 14 and 16, at 191 and 193, respectively.

Figure 14:
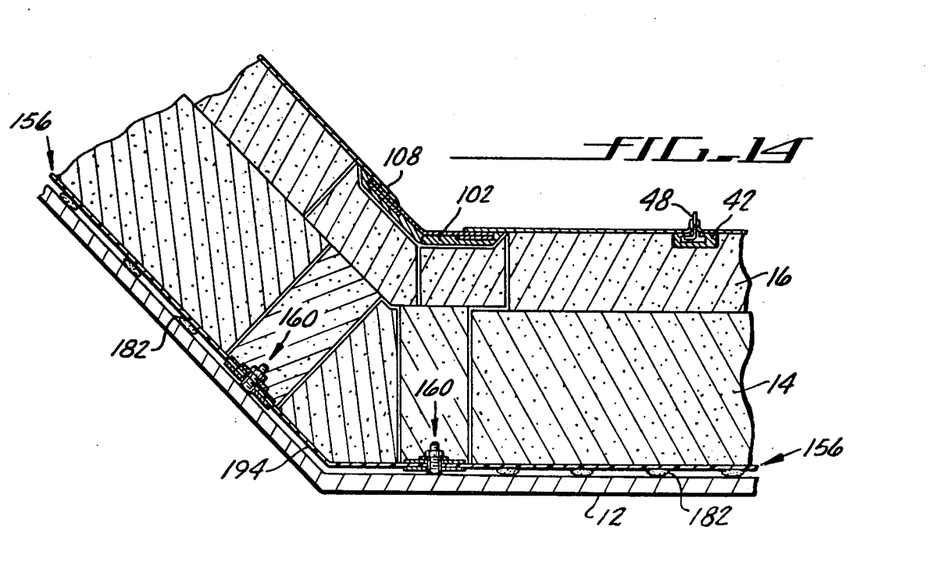
FIG. 14 is a section similar to FIG. 4, showing the construction at a 135° longitudinal corner, including the stand-off panel of FIG. 12 and the means for supporting same at such corner.

The structures shown in FIGS. 12 and 13 illustrate the construction and placement of the stand off panel 156 along all portions of the inner tank surface except for the corners. Referring to FIG. 14, showing a 135° longitudinal corner like that shown in FIG. 4, it is seen that the connector structures 160 are positioned adjacent the apex of the corner, and a corner stand off or insulation support panel member 194 having an angle of 135° is positioned between the adjacent connector systems 160 at such 135° corner, and connected at opposite ends to the stand off panel 156.

Figure 15:
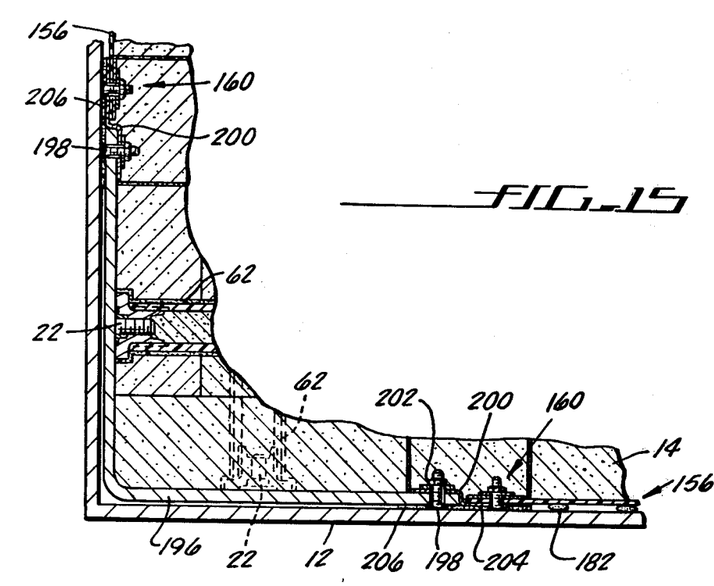
FIG. 15 is a section similar to FIG. 2, shownning the construction at a 90° transverse corner section, including the insulation support panel and the means for supporting same at such corner.

FIG. 15 illustrates the stand off panel construction at a 90° corner angle such as that illustrated in FIG. 2. In FIG. 15, there is provided a steel corner stand off plate 196 in the form of a right angle, which is supported at its opposite end portions by studs 198 welded to the inner ship hull 12. For this purpose the end portions of the corner stand off plate 196 are provided with angle members 200 which are held in position by the studs 198 and associated nuts 202, the angle members 200 being bent into a Z shape around the ends of the corner stand off plate 196 and providing a flat outwardly extending portion 204 held in position by the connector structures 160, such end portions 204 and the outer surface of the adjacent end portions of stand off corner plate 196, adjacent the studs 198 being adhesively bonded at 206 to the surface of the inner ship hull. It will be noted that the adhesive layer 206 is sufficiently thick to maintain the corner stand off or support plate 196 spaced a short distance from the inner ship hull.

In the corner structure of FIG. 15, it will be noted that the Nelson studs 22 to which the couplers 62 are connected, are mounted on the corner stand off plate 196, instead of on the inner ship hull 12, as in the embodiment of FIG. 2 not incorporating a stand off panel.

The stand off panel construction around the trihedron corner, formed of both the 135° corner and the 90° corner, as shown in FIGS. 6 and 7 is similar to that illustrated in FIGS. 14 and 15, except that the corner stand off panel corresponding to 194 and 196 in FIGS. 14 and 15, will be in the shape of a trihedron similar to that of the steel trihedron angle 114 in FIGS. 6 and 7, but spaced therefrom as illustrated in FIG. 15.

Figure 16:
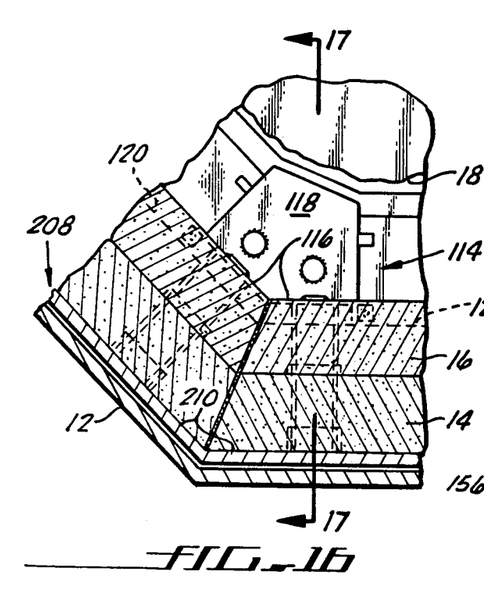
FIG. 16 is a section similar to FIG. 6, showing the construction at a three way corner, and including a support panel.
Figure 17:
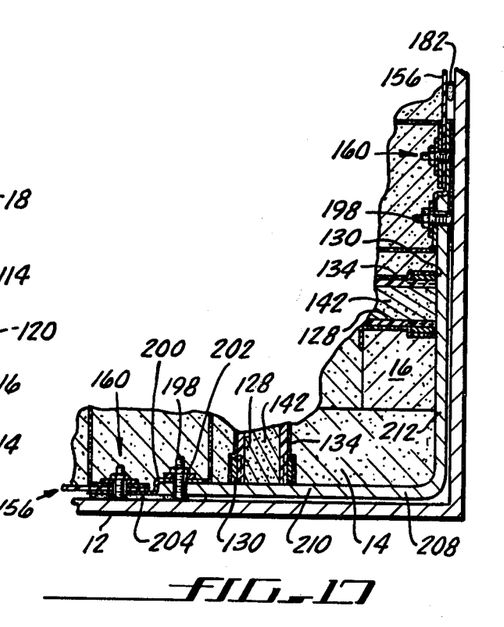
FIG. 17 is a section similar to FIG. 7, and including the support panel, taken on line 17—17 of FIG. 16.

Such stand off panel construction for the trihedron or three way corner is shown in FIGS. 16 and 17. Thus, the stand off plate 208 in FIGS. 16 and 17 is in the form of a trihedron, with two sides 210 forming an angle of 135° with each other, and a third side 212 forming a 90° angle with each of sides 210. The sides 210 and 212 of trihedron stand off plate 208 are maintained in spaced relation from the inner ship hull 12 as in the case of stand off corner plates 194 and 196 in FIGS. 14 and 15, namely by employing the connecting structures 160 and the supporting and connecting components 198, 200, 202 and 204, shown in FIGS. 14 and 15, the stand off plate 208 being connected at its opposite ends to the main stand off panel 156. However, in the embodiment of FIGS. 16 and 17, it will be noted that the outer ends of the coupler tubes 128 are threaded into the steel tubes 130 which are in turn welded to the trihedron stand off plate 208. It will thus be seen that in this embodiment, both tension and bending loads due to contraction of the primary liner 18 will be transmitted through the couplers 128 to the stand off panel 208 and in turn from the stand off panel 208 to the inner ship hull 12.

It is accordingly seen that there is provided according to the invention novel support systems for the primary liner of a cryogenic insulation system for tanks and ships, including layers of reinforced foam insulation, and particularly incorporating corner structures at varying angles, designed especially to transmit both tension and bending loads from the primary membrane to the inner ship hull, and avoiding buckling and rupture of the primary membrane, as well as the foam insulation layers between the primary membrane and the tank wall or ship hull. Novel means are provided for supporting the primary or inner liner membrane over the adjacent insulation layer without adhesive bonding therebetween. Also provided are means and procedure for applying same, to support and maintain the foam insulation system spaced from the inner wall of a container or ship hull, even though such wall or ship hull is uneven or warped, avoiding attachment of the foam insulation to the wall or ship hull, and affording a water sump to trap water adjacent the inner ship hull. The invention also embodies as an important feature the use of novel means for connecting the primary liner or membrane to the wall of the container or ship hull at a corner thereof, so as to permit relative movement of such connection and the foam insulation layer at such corner, under tension loads applied by the membrane and transmitted to the container wall or ship hull at such corner.

Although the cryogenic insulation system of the invention is particularly effective for use on ships or tankers, such system can be used on any container for cryogenic liquids, including barges, storage tanks, aircraft or space vehicles. The thickness of the 3D fiber reinforced foam insulation in the system can be varied to limit the boiloff to suit the need of the specific design.

While I have described particular embodiments of my invention for purposes of illustration, it is understood that other modifications and variations will occur to those skilled in the art, and the invention accordingly is not to be taken as limited except by the scope of the appended claims.

What is claimed is:

1. A container for cryogenic liquefied gases which comprises a container wall, at least one fiber reinforced plastic foam insulation layer disposed within said container wall and a low temperature resistant metal liner disposed adjacent the inner side of said at least one foam insulation layer, the reinforcement fibers of said fiber reinforced foam insulation layer adjacent said liner being extended beyond the outer surface of said foam insulation layer, the exposed fiber ends of said fiber reinforced foam insulation layer extending beyond the outer surface of said foam insulation layer being stiffened, supporting said metal liner and permitting said liner to slide over the adjacent surface of said foam insulation layer, and providing a space between said liner and said foam insulation layer for purging gases from said space.

2. A container as defined in claim 1, wherein said foam insulation layer is an X, Y and Z fiber reinforced polyurethane foam layer, and said outwardly extending exposed fiber ends are the ends of Z fibers, and said Z fiber ends being stiffened by application of a hard resin to said fiber ends.

3. A container as defined in claim 1, including a second fiber reinforced plastic foam insulation layer adjacent said at least one foam insulation layer and disposed adjacent said container wall, a second liner positioned between said at least one foam insulation layer and said second foam insulation layer, said second liner acting as barrier to passage of cryogenic fluid from said at least one foam insulation layer into said second foam insulation layer.

4. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said layers being X, Y and Z fiber reinforced polyurethane foam insulation layers, said outer foam insulation layer being positioned adjacent said inner ship hull, a primary low temperature resistant low thermal expansion liner disposed adjacent the inner surface of said primary foam insulation layer, a secondary liner on the inner surface of said secondary foam insulation layer and between adjacent surfaces of said primary and secondary foam insulation layers, the reinforcement fiber ends extending beyond the surface of said primary foam insulation layer and being stiffened, said stiffened fiber ends supporting said primary liner and permitting said primary liner to slide over the adjacent inner surface of said primary foam insulation layer, and providing a space between said primary liner and said foam insulation layer for purging gases from said space.

5. A ship for transporting cryogenic liquefied gases as defined in claim 4, said primary liner being a high nickel steel liner, and including tongue means connected to said metal liner at spaced locations along said liner and extending outwardly into said primary foam insulation layer, tongue retainer means disposed in and connected to said primary foam insulation layer adjacent said inner surface thereof, said retainer means comprising a plurality of strips within grooves formed in said primary foam insulation layer, said strips being bonded to said primary foam insulation layer and containing channels, said outwardly extending tongue means being engaged in said channels and holding said primary liner in position adjacent said primary foam insulation layer.

6. A container for cryogenic liquefied gases which comprises a container wall, at least one fiber reinforced plastic foam insulation layer disposed within said container wall, a low temperature resistant metal liner in contact with the inner side of said at least one foam insulation layer, said container having corners and including at least one corner structure, said corner structure comprising a corner support, said corner support being disposed in said at least one foam insulation layer adjacent said metal liner at said corner of said container wall, means connecting said metal liner to said corner support, coupler means positioned in said at least one foam insulation layer, means connecting said corner support to said coupler means, and means connecting said coupler means to the wall of said container, said corner support and said coupler means transmitting tension loads from said metal liner to the wall of said container, said means connecting said corner support to said coupler means being movable with respect to said coupler means, and permitting the foam insulation at the corner to move under an unsymmetric load applied by said liner.

7. A container as defined in claim 6, said means connecting said corner support to said coupler means being a bolt having a flexible connection to said coupler means.

8. A container as defined in claim 6, said corner structure being positioned at a 90° corner of said container wall, said corner support being a non-metallic insulating corner support.

9. A container as defined in claim 6, including a second fiber reinforced plastic foam insulation layer adjacent said at least one foam insulation layer and disposed adjacent sad container wall, a second liner positioned between said at least one foam insulation layer and said second foam insulation layer, said second liner acting as barrier to passage of cryogenic fluid from said at least one foam insulation layer into said second foam insulation layer, said coupler means positioned in said at least one foam insulation layer and in said second foam insulation layer, said coupler means being bonded to said at least one insulation layer and to said second insulation layer.

10. A container as defined in claim 9, said corner structure being positioned at a 90° corner of said container wall, said corner support being a non-metallic insulating corner support disposed in said at least one foam insulation layer adjacent said metal liner at said 90° corner of said container wall, said means connecting said corner support to said coupler means being a bolt mounted on said corner support and having a rotatable connection to said coupler means.

11. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary low temperature resistant low thermal expansion liner in contact with the inner surface of said primary foam insulation layer, a secondary liner on the inner surface of said secondary foam insulation layer and between adjacent surfaces of said primary and secondary foam insulation layers, said inner ship hull having a corner, a corner structure at said corner, said primary liner being disposed at said corner with adjacent portions thereof at an angle to each other, a coupler positioned in both said primary and said secondary foam insulation layers adjacent said corner structure, said coupler being an elongated member disposed parallel to one of said portions of said primary liner at said corner, means connecting said primary liner to said coupler, said connecting means including a corner support member in said at least one foam insulation layer adjacent said metal liner, and bolt means connected at one end to said corner support member and having a flexible connection to said coupler, and means connecting said coupler to said inner ship hull, said corner support member, bolt means and coupler transmitting tension loads from said last mentioned portion of said primary liner to said inner ship hull.

12. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary low temperature resistant low thermal expansion liner in contact with the inner surface of said primary foam insulation layer, a secondary liner on the inner surface of said secondary foam insulation layer and between adjacent surfaces of said primary and secondary foam insulation layers, said inner ship hull having a corner, a corner structure at said corner, said primary liner being disposed at said corner with adjacent portions thereof at an angle to each other, a non-metallic insulating coupler positioned in both said primary and said secondary foam insulation layers adjacent said corner structure, said coupler being an elongated member disposed parallel to one of said portions of said primary liner at said corner, means connecting said primary liner to said coupler, said connecting means including a corner support member in said inner foam insulation layer adjacent said metal liner, bolt means connected at one end to said corner support member and having a rotatable connection to said coupler, said corner being a 90° corner, and including a plurality of said couplers spaced parallel to each other in said primary and secondary foam insulation layers and a plurality of second like couplers spaced parallel to each other at a 90° angle from said first couplers, said second couplers being alternately disposed between adjacent first mentioned couplers at said 90° corner, said means including said bolt means connecting said primary liner to each of said couplers at said 90° corner, and means connecting each of said couplers to the inner ship hull, said corner support member, bolt means and couplers transmitting tension loads from both of the 90° primary liner portions at said 90° corner to said inner ship hull.

13. A ship for transporting cryogenic liquefied gases as defined in claim 12, each of said couplers being of high strength plastic material, and being tubular, said couplers being adhesively bonded to said primary and secondary insulation layers, said corner support member being a plywood corner support, said bolt means being a bolt having a ball joint, and a seat at one end of each of said couplers for receiving said ball joint and permitting rotation thereof.

14. A container for cryogenic liquefied gases which comprises a container wall, at least one fiber reinforced plastic foam insulation layer disposed within said container wall, a low temperature resistant metal liner in contact with the inner side of said at least one foam insulation layer, said container having corners and including at least one corner structure, said corner structure comprising a corner support, said corner support being disposed in said at least one foam insulation layer adjacent said metal liner at said corner of said container wall, means connecting said metal liner to said corner support, coupler means positioned in said at least one foam insulation layer, means connecting said corner support to said coupler means, and means connecting said coupler means to the wall of said container, said corner support and said coupler means transmitting tension loads from said metal liner to the wall of said container, said means connecting said corner support to said coupler means being a bolt having a ball joint, and means associated with said coupler means for receiving said ball joint and permitting rotation thereof, thereby permitting the foam insulation at the corner to move under an unsymmetric load applied by said liner.

15. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said outer foam insulation layer being positioned adjacent said inner ship hull, a primary low temperature resistant low thermal expansion liner in contact with the inner surface of said primary foam insulation layer, a secondary liner on the inner surface of said secondary foam insulation layer and between adjacent surfaces of said primary and secondary foam insulation layers, said inner ship hull having a corner, a corner structure at said corner, said primary liner being disposed at said corner with adjacent portions thereof at an angle to each other, a coupler positioned in both said primary and said secondary foam insulation layers adjacent said corner structure, said coupler being an elongated member disposed parallel to one of said portions of said primary liner at said corner, means connecting said primary liner to said coupler, said connecting means including a corner support member in said inner foam insulation layer adjacent said metal liner, and bolt means connected at one end to said corner support member and having a flexible connection to said coupler, and means connecting said coupler to said inner ship hull, said corner support member, bolt means and coupler transmitting tension loads from said last mentioned portion of said primary liner to said inner ship hull, said primary liner being a high nickel steel liner, said corner being a 90° corner, said corner support member being a wood corner support, and said bolt means being a bolt having a ball joint, and means associated with said coupler means for receiving said ball joint and permitting rotation thereof.

16. A container for cryogenic liquefied gases which comprises a container wall, at least one fiber reinforced plastic foam insulation layer disposed within said container wall and a low temperature resistant metal liner disposed adjacent the inner side of said at least one foam insulation layer, the reinforcement fibers of said fiber reinforced foam insulation layer adjacent said liner being extended beyond the outer surface of said foam insulation layer, supporting said metal liner and providing a space between said liner and said foam insulation layer for purging gases from said space, said container having corners and including at least one corner structure, said corner structure comprising a corner support, said corner support being disposed in said at least one foam insulation layer adjacent said metal liner at said corner of said container wall, means connecting said metal liner to said corner support, coupler means positioned in said at least one foam insulation layer, means connecting said corner support to said coupler means and means connecting said coupler means to the wall of said container, said corner support and said coupler means transmitting tension loads from said metal liner to the wall of said container, said means connecting said corner support to said coupler means being moveable with respect to said coupler means, and permitting the foam insulation at the corner to move under an unsymmetric load applied by said liner.

17. A container for cryogenic liquefied gases as defined in claim 16, the exposed fiber ends of said fiber reinforced foam insulation layer extending beyond the outer surface of said foam insulation layer being stiffened, said means connecting said corner support to said coupler means being a bolt having a rotatable connection to said coupler means.

18. A ship for transporting cryogenic liquefied gases which comprises an inner ship hull, a foam insulation system including an inner primary fiber reinforced polyurethane foam insulation layer, and an outer secondary fiber reinforced polyurethane foam insulation layer, said layers being X, Y and Z fiber reinforced polyurethane foam insulation layers, said outer foam insulation layer being positioned adjacent said inner ship hull, a primary low temperature resistant low thermal expansion liner disposed adjacent the inner surface of said primary foam insulation layer, a secondary liner on the inner surface of said secondary foam insulation layer and between adjacent surfaces of said primary and secondary foam insulation layers, the reinforcement fiber ends extending beyond the surface of said primary foam insulation layer and being stiffened, said stiffened fiber ends supporting said primary liner and providing a space between said primary liner and said foam insulation layer for purging gases from said space, said inner ship hull having a corner, a corner structure at said corner, said primary liner being disposed at said corner with adjacent portions thereof at an angle to each other, a coupler positioned in both said primary and said secondary foam insulation layers adjacent said corner structure, said coupler being an elongated member disposed parallel to one of said portions of said primary liner at said corner, means connecting said primary liner to said coupler, said connecting means including a corner support member in said primary foam insulation layer adjacent said metal liner, and bolt means connected at one end to said corner support member and having a rotatable connection to said coupler, and means connecting said coupler to said inner ship hull, said corner support member, bolt means and coupler transmitting tension loads from said last mentioned portion of said primary liner to said inner ship hull.

19. A ship for transporting cryogenic liquefied gases as defined in claim 18, said bolt means being a bolt having a ball joint, and means associated with said coupler means for receiving said ball joint and permitting rotation thereof.

20. A ship for transporting cryogenic liquefied gases as defined in claim 18, wherein said outwardly extending exposed fiber ends are the ends of Z fibers, and said Z fiber ends being stiffened by application of a hard resin to said fiber ends.

21. A ship for transporting cryogenic liquefied gases as defined in claim 20, said primary liner being a high nickel steel liner, and including tongue means connected to said metal liner at spaced locations along said liner and extending outwardly into said primary foam insulation layer, tongue retainer means disposed in and connected to said primary foam insulation layer adjacent said inner surface thereof, said retainer means comprising a plurality of strips within grooves formed in said primary foam insulation layer, said strips being bonded to said primary foam insulation layer and containing channels, said outwardly extending tongue means being engaged in said channels and holding said primary liner in position adjacent said primary foam insulation layer but permitting said primary liner to slide over the adjacent surface of said foam insulation, said corner being a 90° corner, said corner support member being a wood corner support, and said bolt means being a bolt having a ball joint, and means associated with said coupler means for receiving said ball joint and permitting rotation thereof.

* * * * *